United States Patent [19]

Pashupathy et al.

[11] Patent Number: 6,078,951
[45] Date of Patent: *Jun. 20, 2000

[54] METHOD AND APPARATUS FOR AUTOMATING A SOFTWARE DELIVERY SYSTEM BY LOCATING, DOWNLOADING, INSTALLING, AND UPGRADING OF VIEWER SOFTWARE

[75] Inventors: Anand Pashupathy, Beaverton; Rodney A. Korn, Hillsboro, both of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/758,233

[22] Filed: Nov. 27, 1996

[51] Int. Cl.[7] .......................... G06F 15/16; G06F 15/177
[52] U.S. Cl. ........................ 709/217; 709/218; 709/221
[58] Field of Search ............................. 395/712, 800.15, 395/653, 182.01, 183.12; 709/217, 218, 219, 220, 221; 707/10; 345/333, 334, 335

[56] References Cited

U.S. PATENT DOCUMENTS

| 5,586,304 | 12/1996 | Stupek, Jr. et al. | 395/712 |
| 5,630,066 | 5/1997 | Gosling | 709/221 |
| 5,687,713 | 11/1997 | Shrader et al. | 395/712 |
| 5,696,975 | 12/1997 | Moore et al. | 395/712 |
| 5,737,495 | 4/1998 | Adams et al. | 707/104 |
| 5,831,611 | 11/1998 | Kennedy et al. | 345/335 |
| 5,838,682 | 11/1998 | Dekelbaum et al. | 370/401 |
| 5,859,978 | 1/1999 | Sonderegger et al. | 709/226 |
| 5,903,762 | 5/1999 | Sakamoto et al. | 395/712 |
| 5,905,492 | 5/1999 | Straub et al. | 345/333 |
| 5,915,131 | 6/1999 | Knight et al. | 345/333 |
| 5,918,012 | 6/1999 | Astiz et al. | 345/335 |
| 5,940,074 | 8/1999 | Britt, Jr. et al. | 345/333 |
| 5,966,126 | 10/1999 | Szabo | 345/348 |
| 5,995,756 | 11/1999 | Hermann | 395/712 |
| 6,009,464 | 12/1999 | Hamilton et al. | 709/219 |
| 6,012,071 | 1/2000 | Krishna et al. | 707/522 |

OTHER PUBLICATIONS

Brown, Mark R., Using Netscape 2, Que Corporation, pp. 64–71,125–126,410–413,989–980, 1995.

*Primary Examiner*—Le Hien Luu
*Assistant Examiner*—Jason D. Cardone
*Attorney, Agent, or Firm*—Blakely, Sokoloff, Taylor & Zafman LLP

[57] ABSTRACT

A method for setting up viewing of a file on a computer system is disclosed. According to the method, a file type of the file is determined. It is determined whether a viewer that supports the file type is installed on the computer system. The computer system interfaces with a server. If the viewer is not installed on the computer system, the computer system obtains a location of the viewer and downloads the viewer from the location. If the viewer is installed on the computer system, a version identifier of the viewer on the computer system is determined and compared with a version identifier of a current version of the viewer on the server. The current version of the viewer is downloaded to the computer system if the version identifier of the current version of the viewer is more recent than the version identifier of the viewer on the computer system.

29 Claims, 5 Drawing Sheets

Fig. 3

| CLASS OF APPLICATIONS | MIME FORMAT | APPLICATION NAME | VERSION NUMBER | DIRECTORY OF EXISTENCE | SOURCE OF APPLICATION |
|---|---|---|---|---|---|
| AUDIO | AU | WAVEFORM | 1.4 | C:\AUDIO | WWW.ABC.COM |
| VIDEO | AVI | MOVIE VIEWER | 2.5 | C:\VIDEO | WWW.DEF.COM |
| TEXT | DOC | MS-WORD | 3.2 | C:\TEXT | WWW.GHI.COM |
| GRAPHICS | GIF | LVIEW PRO | 1.2 | C:\GRAPHICS | WWW.JKL.COM |
| ... | ... | ... | ... | ... | ... |

Fig. 4

| CLASS OF APPLICATIONS | MIME FORMAT | APPLICATION NAME | VERSION NUMBER | DIRECTORY OF EXISTENCE | LOCATION | SCRIPT DIRECTORY |
|---|---|---|---|---|---|---|
| SOUND | AU | WAVEFORM | 1.5 | | WWW.XYZ.COM | WEBSERVER\SCRIPT\WAVEFORM |
| VIDEO | MPEG | NETTOOB | 2.3 | \\WEBSERVER\APPS\NETTOOB | | WEBSERVER\SCRIPT\NETTOOB |
| TEXT | PS | GHOSTSCRIPT | 2.5 | | WWW.PQR.COM | WEBSERVER\SCRIPT\GHOSTSCRIPT |
| VIDEO | ZIP | WIN ZIP | 3.0 | \\WEBSERVER\APPS\WINZIP | | WEBSERVER\SCRIPT\WINZIP |
| ... | ... | ... | ... | ... | ... | ... |

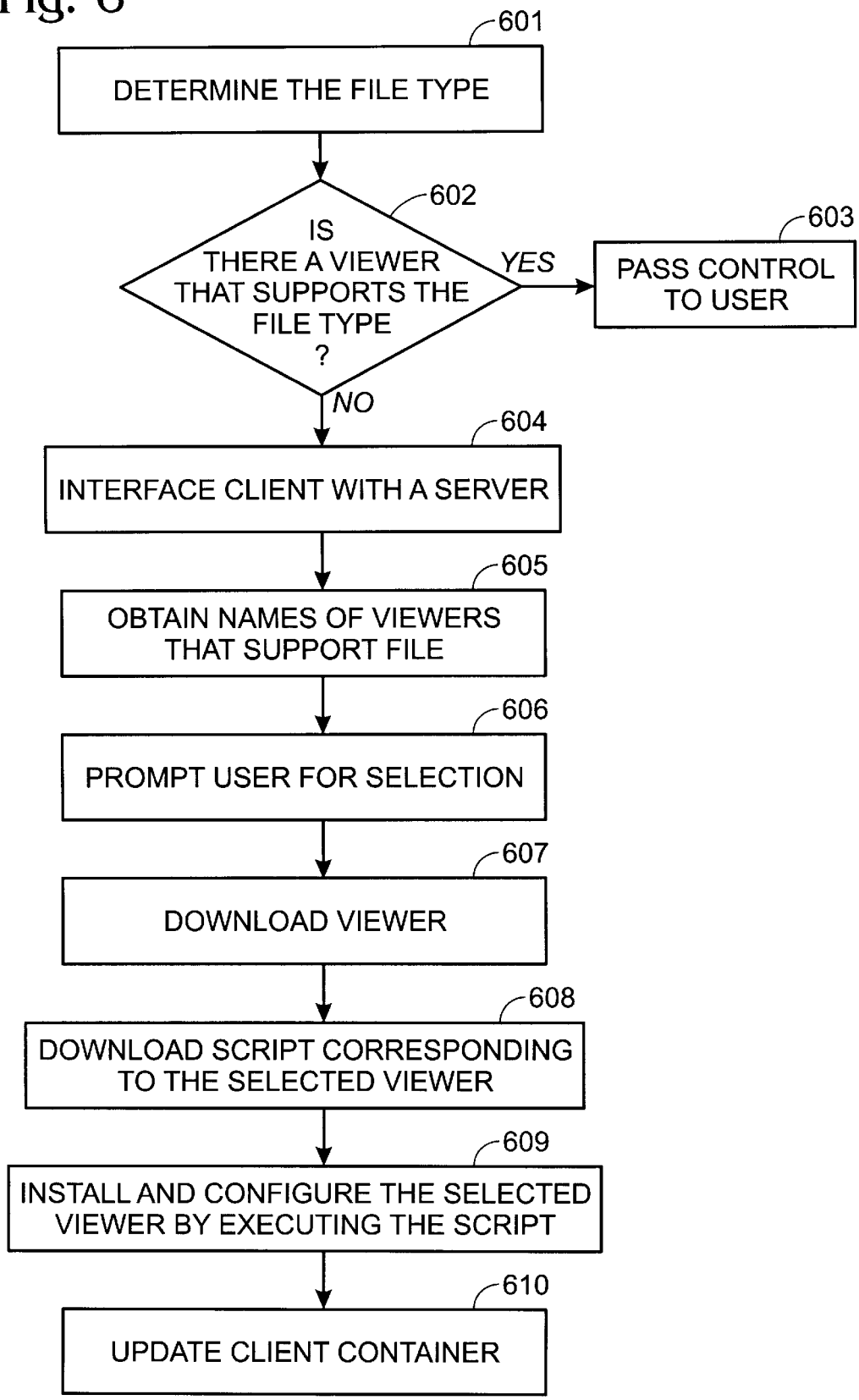

METHOD AND APPARATUS FOR AUTOMATING A SOFTWARE DELIVERY SYSTEM BY LOCATING, DOWNLOADING, INSTALLING, AND UPGRADING OF VIEWER SOFTWARE

FIELD OF THE INVENTION

The present invention pertains to helper applications used by Internet browsers. More specifically, the present invention relates to a software delivery system that automatically locates, installs, configures, and updates software on a user's computer system.

BACKGROUND OF THE INVENTION

The Internet has become an expansive backbone of communication with a vast repository of information available in various formats. The formats include simple text, audio, graphics, and video and are also known as Multiple Internet Mail Extension (MIME) formats. Internet browsers allow users to interface with the Internet and display files that belong to many of these formats.

Current browsers do not have the capability to support all of the MIME formats available on the Internet. Thus, in order to view a downloaded file having a MIME format that the browser does not support, a user must find a viewer for the file and configure the viewer to support the file. Viewers are software applications that facilitate viewing of a particular format on a computer system. A viewer may be, for example, a "plug-in" that enhances the capability of a browser by supporting different MIME formats intrinsically. A viewer may also be, for example, a "helper application" which is spawned for formats a browser cannot understand. The existence of many formats and applications associated with the files on the Internet make it difficult and time-consuming for a common user to search for the viewers and regularly up-date them. It is even more difficult for the user to install and configure the viewers. The installation and configuration process may include the steps of finding an appropriate viewer, allocating an appropriate location to store the viewer, reformatting the viewer to a usable form, copying the viewer into appropriate operating system directories, and updating the viewer with the most current version. Users unfamiliar with computers will find the steps in the installation and configuration process, difficult to complete.

The installation and configuration process of software is not limited to that of installing and configuring viewers for browsers. The problems associated with the installation and configuration of viewers for browsers also exist for users downloading software from software vendors using the Internet. Software vendors are using the Internet as a vehicle for software delivery. Vendors prefer using the Internet over the conventional method of creating sets of disks to distribute their product. Using the Internet saves the vendors money and time by not requiring the manufacture and shipment of software disks.

Thus, an apparatus and method is needed for automating the searching, installation, configuration, and updating of software for a computer system.

SUMMARY OF THE INVENTION

According to one embodiment of the present invention, a method for setting up viewing of a file on a computer system is disclosed. According to the method, a file type of the file is determined. It is determined whether a viewer that supports the file type is installed on the computer system. The computer system interfaces with a server. If the viewer is not installed on the computer system, the computer system obtains a location of the viewer and downloads the viewer from the location. If the viewer is installed on the computer system, a version identifier of the viewer on the computer system is determined and compared with a version identifier of a current version of the viewer. The current version of the viewer is downloaded to the computer system if the version identifier of the current version of the viewer on the server is more recent than the version identifier of the viewer on the computer system.

According to an alternate embodiment of the present invention, a method of downloading software from a server to a computer system is disclosed. According to the method, the computer system interfaces with the server. The software is retrieved from the server. Instructions on how to install and configure the software on the computer system is retrieved from the server. The software on the computer system is installed and configured by executing the instructions.

BRIEF DESCRIPTION OF THE DRAWINGS

The present invention is illustrated by way of example and not by way of limitation in the figures of the accompanying drawings, in which like references indicate similar elements and in which:

FIG. 3 illustrates the structure of a client container according to one embodiment of the present invention;

FIG. 4 illustrates the structure of a server container according to one embodiment of the present invention;

FIG. 5 illustrates a server repository according to one embodiment of the present invention;

FIG. 6 is a flow chart illustrating a method of setting up viewing of a file according to one embodiment of the present invention.

DETAILED DESCRIPTION

A method and apparatus for setting up viewing of a file is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Network Overview

Figure 1:
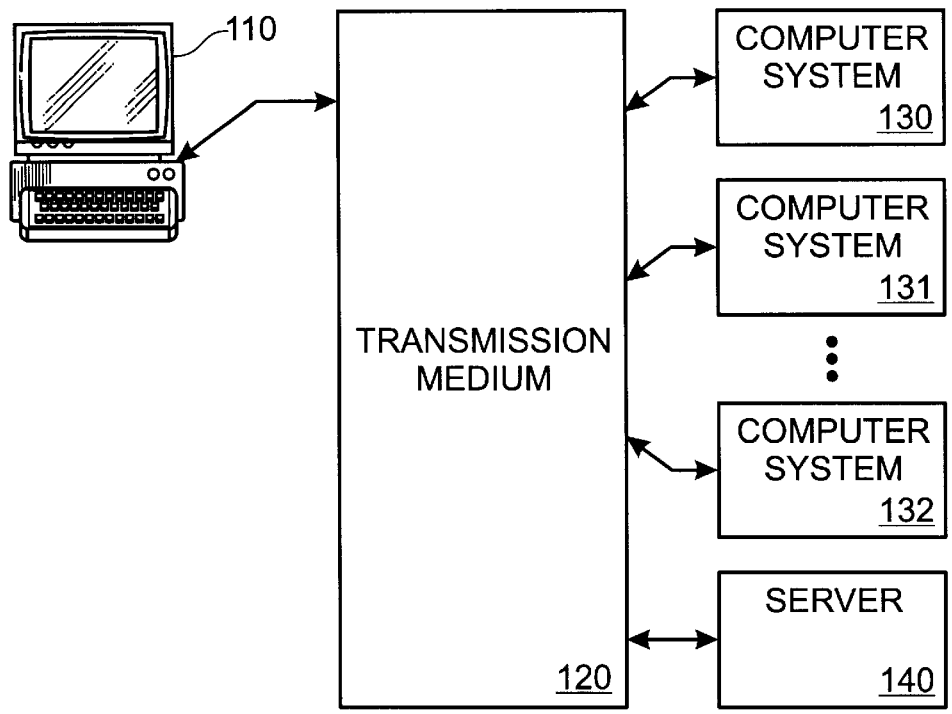
FIG. 1 illustrates a network in which the present invention is implemented.

FIG. 1 illustrates an exemplary network upon which an embodiment of the present invention is implemented. A client computer system 110 interfaces with a plurality of other computer systems 130–132 via transmission medium 120 to obtain files. In one embodiment of the present invention, computer systems 130–132 are web sites with Internet addresses and transmission medium 120 provides an Internet connection. In another embodiment of the present invention, computer systems 130–132 are personal computers and transmission medium 120 is an internal network connection. The client computer system 110 interfaces with a server 140 to obtain the names of viewers that support files downloaded onto the client computer system 110. The server 140 also provides information as to the location of the viewers, the current version number of the viewer, and a script containing executable instructions that install and configure the viewer onto the client computer system 110.

Hardware Overview

Figure 2:
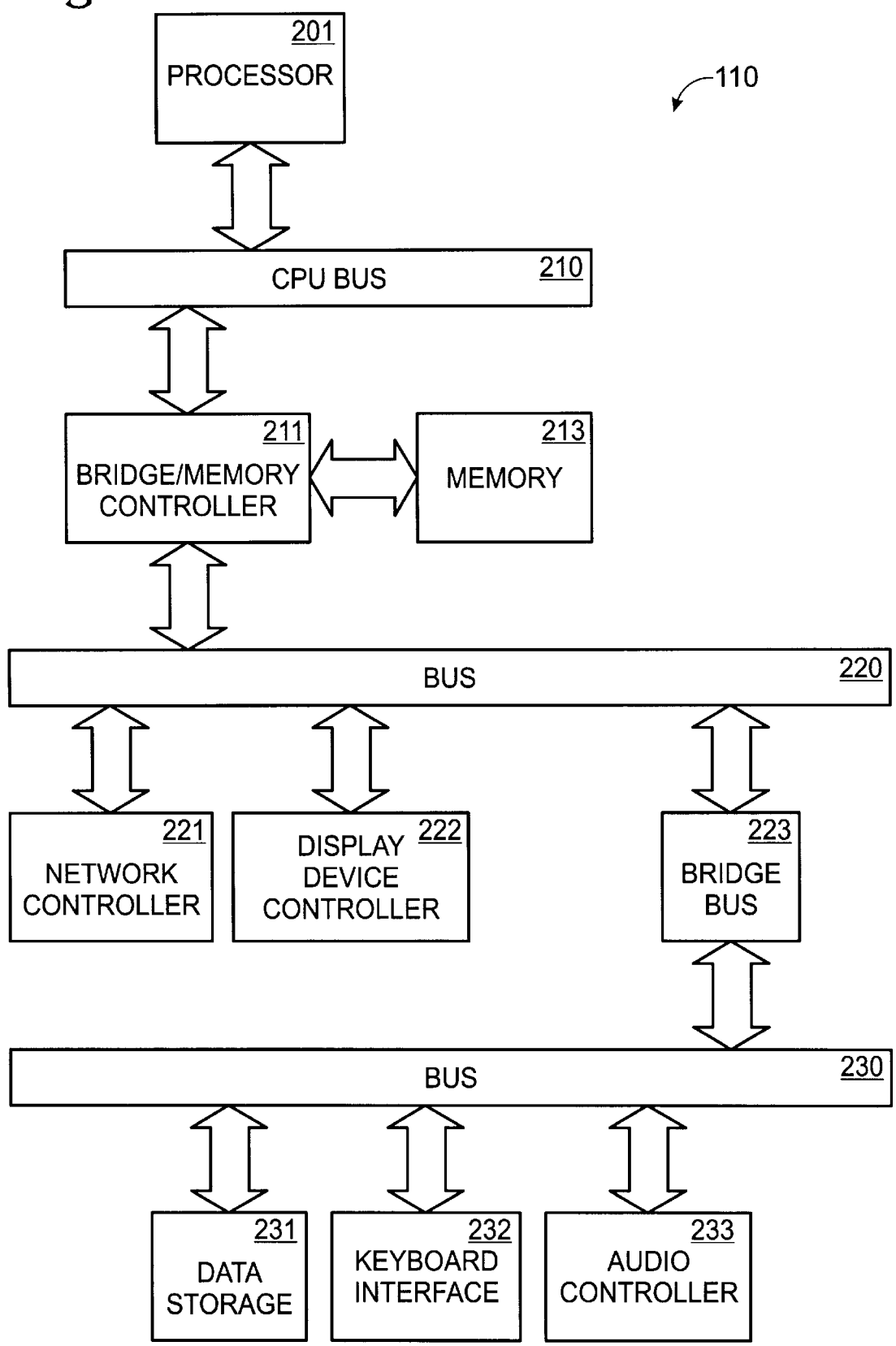
FIG. 2 illustrates a block diagram of a computer system implementing one embodiment of the present invention.

Referring to FIG. 2, an exemplary client computer system 110 upon which an embodiment of the present invention can be implemented is shown. The client computer system 110 comprises a processor 201 that processes digital data. The processor 201 can be a complex instruction set computing (CISC) microprocessor, a reduced instruction set computing (RISC) microprocessor, a very long instruction word (VIUW) microprocessor, a processor implementing a combination of instruction sets, or other processor device. The processor 201 is coupled to a CPU bus 210 which transmits signals between the processor 201 and other components in the client computer system 110.

For the illustrated embodiment, a memory 213 comprises a dynamic random access memory (DRAM) device, a static random access memory (SRAM) device, or other memory devices. The memory 213 stores information or other intermediate data during execution by the processor 201. A bridge memory controller 211 is coupled to the CPU bus 210 and the memory 213. The bridge memory controller 211 directs data traffic between the processor 201, the memory 213, and other components in the client computer system 110 and bridges signals from these components to a high speed I/O bus 220.

For the illustrated embodiment, the high speed I/O bus 220 supports peripherals operating at high data throughput rates. The bus 220 can be a single bus or a combination of multiple buses. As an example, the bus 220 can comprise a Peripheral Components Interconnect (PCI) bus, a Personal Computer Memory Card International Association (PCMCIA) bus, or other buses. The bus 220 provides communication links between components in the client computer system 110. A network controller 221 links a network of computers together and provides communication among the machines. A display device controller 222 is coupled to the high speed I/O bus 220. The display device controller 222 allows coupling of a display device to the computer system and acts as an interface between the display device and the client computer system 110. The display device receives information and data from the processor 201 through the display device controller 222 and displays the information and data to the user of the client computer system 110.

For the illustrated embodiment, a bus bridge 223 couples the high speed I/O bus 220 to I/O bus 230. The bus bridge 223 comprises a translator to bridge signals between the high speed I/O bus 220 and the I/O bus 230.

The I/O bus 230 is used for communicating information between peripheral device which operate at lower throughput rates. The I/O bus 230 can be a single bus or a combination of multiple buses. As an example, the bus 230 can comprise an Industry Standard Architecture (ISA) bus, an Extended Industry Standard Architecture (EISA) bus or a Micro Channel Architecture (MCA) bus. The bus 230 provides communication links between components in the client computer system 110. A keyboard interface 232 can be a keyboard controller or other keyboard interface. The keyboard interface 232 can be a dedicated device or can reside in another device such as a bus controller or other controller. The keyboard interface 232 allows coupling of a keyboard to the computer system and transmits signals from a keyboard to the client computer system 110. A data storage device 231 can be a hard disk drive, a floppy disk drive, a CD-ROM device, a flash memory device or other mass storage device. An audio controller 233 operates to coordinating the recording and playing of sounds is also coupled to I/O bus 230.

The present invention is related to the use of the client computer system 110 to set up file viewing. According to one embodiment, setting up viewing of a file is performed by client computer system 110 in response to the processor 201 executing sequences of instructions contained in the memory 213. Such instructions may be read into the memory 213 from other computer-readable mediums such as data storage device 231. Execution of the sequences of instructions contained in the memory 213 causes the processor to set up file viewing, as will be described hereafter. In alternative embodiments, hard-wired circuitry may be used in place of or in combination with software instructions to implement the present invention. Thus, the present invention is not limited to any specific combination of hardware circuitry and software.

Client Container

The client computer system 110 registers information relating to the viewers installed on the client computer system 110. FIG. 3 illustrates one embodiment of a client container 300 according to the present invention. The client container 300 contains an "Application Name" field 330 listing the application names of viewers installed on the client computer system 110. For each viewer, the client container 300 lists the classification of the viewer under a "Class of Applications" field 310. A viewer maybe classified, for example, as being an audio viewer, a video viewer, a text viewer, or a graphics viewer. The MIME format which each viewer supports is also listed for each viewer in the data container under a "MIME Format" field 320. Version numbers of each viewer is listed in a "Version Number" field 340 in the client container 300. The location of where each of the viewers are stored on the client computer system 110 is written into a "Directory of Existence" field 350 in the client container 300. The client container also records the source of the viewer in a "Source of Application" field 360 in the client container 300. The source of a viewer maybe for example an address of a web site where the viewer was downloaded.

Thus, given a MIME format, information regarding any viewer on the client computer system 110 that supports the MIME format may be accessible from the client container 300. The client container 300 is updated each time a new viewer is installed onto the client computer system 110 and each time a new version of a viewer is installed onto the client computer system 110. The client container 300 may be configured to register any number of viewer applications and may be configured to record additional fields of information. In an alternate embodiment of the present invention, the client container registers information relating to software applications installed on the client computer system 110. The client container 300 may be implemented by any known techniques.

Server Container

The server 140 registers information relating to the viewers for which scripts are available on the server 140. FIG. 4 illustrates one embodiment of a server container 400 according to the present invention. The server container 400 contains an "Application Name" field 430 listing the viewer names for which scripts are available on the server 140. For each viewer, the server container 400 lists a classification of the viewer under a "Class of Applications" field 410. The MIME format which each viewer supports is also listed for each viewer in the server container 400 under a "MIME Format" field 420. Version numbers of each viewer is listed in a "Version Number" field 440 in the server container 400. If a particular viewer is stored on the server 140, the location of where each of the viewers are stored on the server 140 is written into a "Directory of Existence" field 450 in the server container 400. If a viewer is not stored on the server 140, the server container 400 lists a location where the viewer maybe downloaded from in a "Source of Application" field 460 in the client container 400. The source of a viewer maybe for example an address of a web site where the viewer was downloaded. The location of a script corresponding to an application is listed in a "Script Directory" field 470. The location indicates where on the server 140 a script corresponding to an application can be found.

Thus, given a MIME format, information regarding any application on the server 140 having a script that supports the MIME format may be accessible on the server container 400. The server container 400 is updated each time a new script for a viewer is installed on the server 140. The server container 400 may be configured to register any number of scripts for viewers and may be configured to record additional fields of information. In an alternate embodiment of the present invention, the client container registers information relating to software applications installed on the client computer system 110. The server container 400 may be implemented by any known techniques.

Server Repository

The server 140 stores scripts and viewer applications in a server repository. FIG. 5 illustrates one embodiment of a server repository 500 according to the present invention. The server repository 500 includes a script section 510 that contains directories that store scripts. The server repository 500 also includes a viewer/application section 520 that contains directories that store viewers available on the server 140. The script section 510 stores scripts for viewers that are stored in the viewer/application section 520 and for viewers that are accessible at other locations. The server repository 500 may be configured to store any number of scripts or viewers and may be configured to store other information relating to viewers or scripts. In an alternate embodiment of the present invention, the server repository 500 stores software applications in the viewer/application section 520 and stores scripts for the software application in the script section. Server repository 500 may be implemented by any known techniques.

Scripts

Each viewer name listed on the server container 400 has a corresponding script stored in the server repository 500. The script contains a plurality of instructions that install and configure the viewer on the client computer system 110 when executed by the client computer system 110. Each script consists of three components, a header, a body, and a footer. The header of the script contains description instructions and execution instructions. The description instructions provides the name of the viewer, a default installation directory, and special comments that need to be displayed to the user for installing the viewer. The execution instructions provides the name of a setup executable that needs to be run. The body of the script contains instructions which write files of the viewer to directories in the operating system. These directories may include a windows directory, a system directory, a home directory of the application, a directory based on environment variables, or other special directories. The footer contains configuration instructions that include making entries to the client container and creating icons for the viewer.

Each viewer application has its own unique installation and configuration requirements, thus making its corresponding script also unique. Viewers that provide a setup program require a simpler script. Viewers that do not provide a setup program require a more complex script that walks the computer system through the installation and configuration process. A typical script for a viewer that does not have a setup program includes instructions that format the viewer into a usable format by decompressing compressed data, copy the viewer files into appropriate operating system directories, restart the operating system, find and execute the file that is supported by the viewer, and execute the viewer.

The scripts can also be used for installing and configuring software applications onto a client computer system. Referring to FIG. 1, the software programs may have been downloaded off of the server 140 or other computer systems 130–132 via transmission medium 120. It should be appreciated that instructions in the scripts may be organized in a variety of manners and that the instructions in the scripts may be written in any known computer language which a scripting engine in the computer system 110 is configured to understand.

Setting Up a Viewer for File Viewing

FIG. 6 is a flow chart illustrating a method for setting up a viewer for viewing a file on a client computer system. At step 601, the client computer system determines a file type of the file by decoding the file suffix of the file. The file suffix of a file indicates the MIME format that the file is in. A file may be formatted, for example, as a sound file, a video file, a graphics file, or a text file.

At step 602, the client computer system determines whether a viewer that supports the format or file type of the file is installed on the client computer system. The determination is made by accessing the client container of the computer system and checking the MIME format field for an application that supports the file type of the file. If a viewer that supports the file type is found, control proceeds to step 603. If a viewer that supports the file type is not found, control proceeds to step 604.

At step 603, the client computer system passes control to the user. The user makes a determination of whether to check to see if the viewer found in step 602 is the most current version of the viewer, to execute the file using the viewer currently installed on the computer system, or save the file.

At step 604, the client computer system interfaces with a server computer system. In one embodiment of the present invention, interfacing is achieved by establishing an Internet connection. In an alternate embodiment of the present invention, interfacing is achieved by establishing an internal network connection.

At step 605, the names of viewers that support the file type found in step 601 is provided to the client computer system. The names of the viewers are obtained by accessing a server container on the server and referencing the MIME format field for viewer application names that support the file type found in step 601.

At step 606, the user of the client computer system is prompted to select one of the viewers provided by step 605. If only one name is provided by step 605, that name is automatically selected for the user.

At step 607, the client computer system downloads the selected viewer. The selected viewer may be downloaded from the server computer system if a copy of the viewer is stored in a repository in the server computer system. If the viewer is not stored in the repository in the server computer system, the client computer system downloads the viewer from a remote location. The server container lists a location of a viewer in a "Directory of Existence" field when the viewer is stored in the server repository. The server container lists a location of a viewer in a "Location" field when the viewer is not stored in the server repository and has to be downloaded from a remote location.

At step 608, the client computer system downloads a script corresponding to the selected viewer from the server computer system. The script resides in the server repository in the server. The location of the script is listed in a "Script Directory" field in the server container.

At step 609, the client computer system installs and configures the selected viewer by executing the instructions in the script.

At step 610, the client computer system updates the client container to reflect the installation of the viewer.

Version Negotiation

Figure 7:
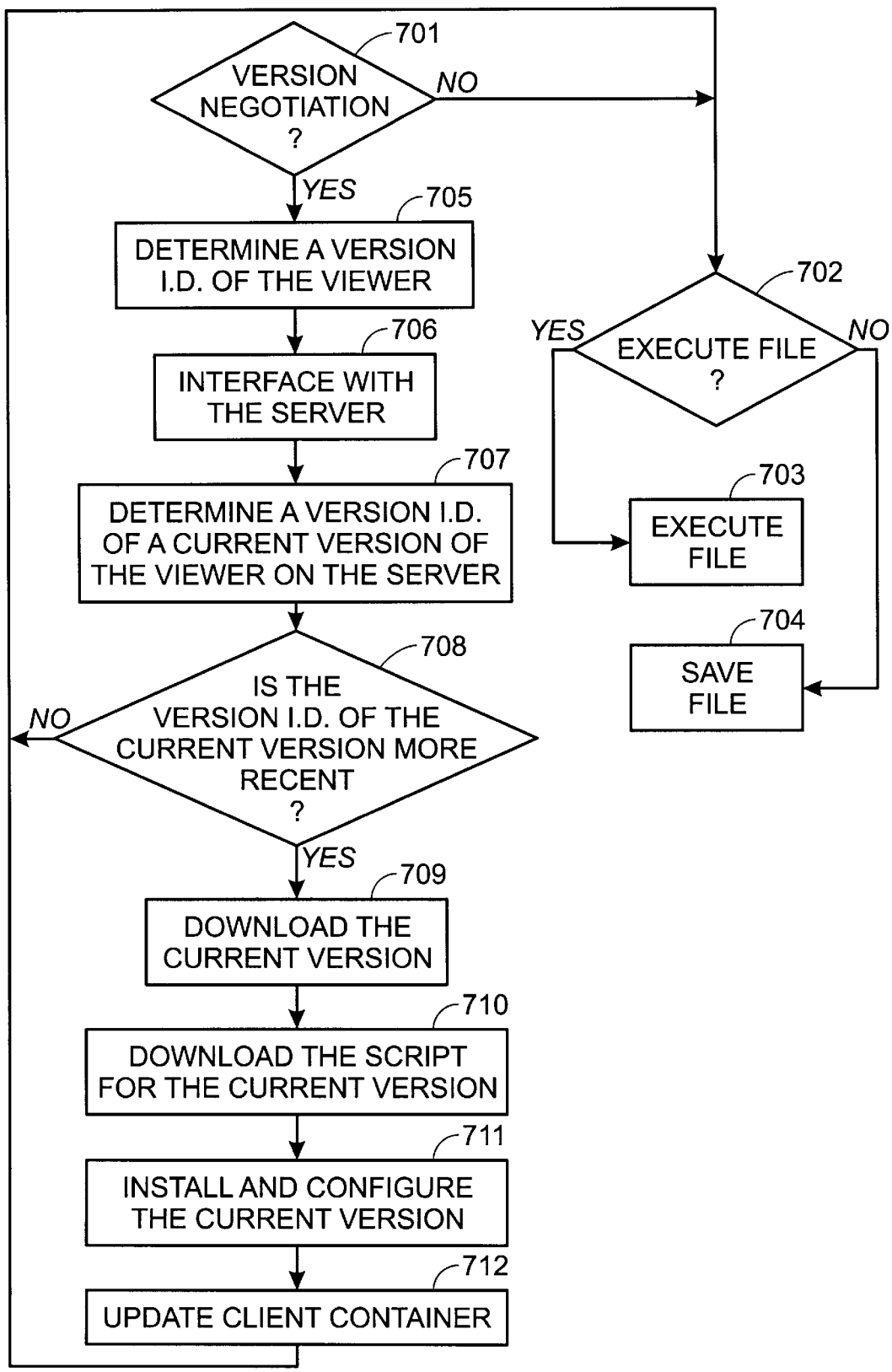
FIG. 7 is a flow chart illustrating a method of updating a version of a viewer according to one embodiment of the present invention.

FIG. 7 is a flow chart illustrating a method for version negotiation. At step 701, the user is prompted to decide whether to update a viewer installed in the client computer system. If the user wishes to update the viewer, control proceeds to step 705. If the user does not wish to update the viewer, control proceeds to step 702.

At step 702, the user is prompted to decide whether to execute the file using the viewer installed on the client computer system or to save the file. If the user wishes to execute the file, control proceeds to step 703. If the user wishes to save the file, control proceeds to step 704.

At step 703, the client computer system executes the file using the viewer installed on the computer system.

At step 704, the client computer system saves the file without executing the file.

At step 705, the client computer system determines a version identifier of the viewer on the client computer system. The version identifier is determined by accessing a "Version Number" field in a client container on the client computer system.

At step 706, the client computer system interfaces with the server computer system. In one embodiment of the present invention, interfacing is achieved by establishing an internet connection. In an alternate embodiment of the present invention, interfacing is achieved by establishing an internal network connection.

At step 707, a version identifier of a current version of the viewer is determined. The version identifier of the current version of the viewer is determined by accessing a "Version Number" field in a server container on the server computer system. According to one embodiment of the present invention, the step of accessing may be obtained by the client computer system or the server computer system.

At step 708, the client computer system determines whether the version identifier of the current version of the viewer is more recent than the version identifier of the viewer installed on the client computer system. If the version identifier is more recent, control proceeds to step 709. If the version identifier is not more recent, control proceeds to step 702.

At step 709, the client computer system downloads the current version of the viewer. The current version of the viewer may be downloaded from the server computer system if a copy of the current version of the viewer is stored in a repository in the server computer system. If the current version of the viewer is not stored in the repository in the server computer system, the client computer system downloads the viewer from a remote location. The server container lists a location of a current version of the viewer in a "Directory of Existence" field when the viewer is stored in the server repository. The server container lists a location of the current version of the viewer in a "Location" field when the viewer is not stored on the server repository and has to be downloaded from a remote location.

At step 710, the client computer system downloads a script corresponding to the current version of the viewer from the server computer system. The script resides in the server repository in the server. The location of the script is listed in a "Script Directory" field in the server container.

At step 711, the client computer system installs and configures the selected viewer by executing the instructions in the script.

At step 712, the client computer system updates the client container to reflected the installation of the current version of the viewer. Control proceeds to step 702.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than an restrictive sense.

What is claimed is:

1. A method for automatically setting up viewing of a file on a computer system, comprising:

selecting a file having an installation script for installing the file, said script including post-restart installation instructions to perform after a restart of an operating system;

determining a file type of the file;

determining whether a viewer that supports the file type is installed on the computer system;

interfacing with the server to obtain automatically an exact location of the viewer, the location residing external to the server;

automatically downloading and installing the viewer from the location; and rebooting the operating system and performing the post-restart installation instructions.

2. The method of claim 1, further comprising the steps of:

determining a version identifier of the viewer on the computer system, if the viewer is installed on the computer system;

interfacing with the server and obtaining a version identifier of a current version of the viewer; and downloading the current version of the viewer onto the computer system if the version identifier of the current version of the viewer is more recent than the version identifier of the viewer on the computer system.

3. The method of claim 1, further comprising the step of writing the name of the viewer in a container on the computer system.

4. The method of claim 1, wherein the step of determining the file type of the file comprises decoding a file suffix of the file.

5. The method of claim 1, wherein the step of determining whether the viewer that supports the file type is installed on the computer system is achieved by accessing information on a container in the computer system.

6. The method of claim 1, wherein the step of obtaining the location of the viewer is achieved by accessing a table on the server listing available viewers and locations of the available viewers.

7. The method of claim 1, wherein the step of interfacing with the server comprises establishing an Internet connection with the server.

8. The method of claim 1, wherein executing the instruction causes the computer system to performs the steps of:

formatting the viewer into a usable format;

copying the viewer into operating directories;

restarting an operating system;

after restarting, executing the file; and after restarting, executing the viewer.

9. The method of claim 1, wherein executing the instruction causes the computer system to perform the step of executing the viewer setup program.

10. A computer-readable medium having stored thereon sequences of instructions, the sequences of instructions including instructions which, when executed by a processor, causes the processor to perform the steps of:

selecting a file having an installation script for installing the file, said script including post-restart installation instructions to perform after a restart of an operating-system;

determining a file type of the file;

determining whether a viewer that supports the file type is installed on the computer system;

interfacing with the server to obtain automatically an exact location of the viewer, the location residing external to the server; and automatically downloading and installing the viewer from the location;

interfacing with a server to obtain automatically an exact location of the viewer, the location residing external to the server;

automatically downloading and installing the viewer from the location; and rebooting the operating system and performing the post-restart installation instructions.

11. The computer readable medium of claim 10, further comprising instructions which, when executed by the processor, causes the processor to perform the step of downloading instructions from the server on how to install and configure the viewer on the computer system.

12. The computer-readable medium of claim 11, wherein the step of obtaining the location of the viewer comprises the step of accessing a table on the server listing available viewers and locations of the available viewers.

13. The computer readable medium of claim 10, further comprising instructions which, when executed by the processor, causes the processor to perform the steps of:

determining a version identifier of the viewer on the computer system, if the viewer is installed on the computer system;

interfacing with the server and obtaining a version identifier of a current version of the viewer; and downloading the current version of the viewer onto the computer system if the version identifier of the current version of the viewer is more recent than the version identifier of the viewer on the computer system.

14. The computer-readable medium of claim 10, further comprising instructions which, when executed by the processor, causes the processor to perform the step of writing the name of the viewer in a container on the computer system.

15. The computer-readable medium of claim 10, wherein the step of determining whether the viewer that supports the file type is installed on the computer system comprises the step of accessing information on a container in the computer system.

16. A method for setting up viewing of a file on a computer system, comprising;

selecting a file having an installation script for installing the file, said script including post-restart installation instructions to perform after a restart of an operating system;

determining a file type of the file;

determining whether a viewer that supports the file type is installed on the computer system;

interfacing with a server to obtain automatically an exact location of the viewer, the location not limited to residing on the server;

automatically downloading and installing the viewer from the location; and rebooting the operating system and performing the post-restart installation instructions.

17. The method of claim 16, further comprising the steps of downloading instructions from the server, which when executed by the computer system installs and configures the viewer on the computer system.

18. The method of claim 17, further comprising the steps of:

determining a version identifier of the viewer on the computer system, if the viewer is installed on the computer system;

interfacing with the server and obtaining a version identifier of a current version of the viewer; and downloading the current version of the viewer onto the computer system if the version identifier of the current version of the viewer is more recent than the version identifier of the viewer on the computer system.

19. The method of claim 18, wherein executing the interaction causes the computer system to perform the steps of:

formatting the viewer into a useable format;

copying the viewer into operating system directories;

restarting an operating system;

after restarting, executing the file; and after restarting, executing the viewer.

20. The method of claim 18, wherein executing the instruction causes the computer system to perform the step of executing a viewer setup program.

21. The method of claim 17, further comprising the step of writing the name of the viewer in a container on the computer system.

22. The method of claim 17, wherein the step of determining the file type of the file comprises decoding a file suffix of the file.

23. The method of claim 17, wherein the step of determining whether the viewer that supports the file type is installed on the computer system is achieved by accessing information on a container in the computer system.

24. The method of claim 17, wherein the step of obtaining the location of the viewer is achieved by accessing a table on the server listing available viewers and locations of the available viewers.

25. The method of claim 17, wherein the step of interfacing with the server comprises establishing an Internet connection with the server.

26. A system for automatically setting up viewing of a file on a computer system, comprising:

- means for selecting a file having an installation script for installing the file, said script including post-restart installation instructions to perform after a restart of an operating system;
- means for determining a file type of the file;
- means for determining whether a viewer that supports the file type is installed on the computer system;
- means for interfacing with the server to obtain automatically an exact location of the viewer, the location residing external to the server;
- means for automatically downloading and installing the viewer from the location; and
- means for rebooting the operating system and performing the post-restart installation instructions.

27. The method of claim 26, the method further comprising:

- re-establishing a connection to the network after said restarting, if the computer system is not already coupled thereto;
- wherein the exact location is eternal to the remote network location.

28. A computer system, comprising:

a bus;

a processor coupled to the bus; and a software delivery system, coupled to the bus, that determines whether a viewer that supports a file type is installed on the computer system and interfaces with a server to obtain automatically an exact location of the viewer and a post-restart installation script if the viewer is not installed on the computer system, the location residing external to the server, automatically downloading and installing the viewer from the location, restarting an operating system, and performing the post-restart installation script.

29. A method for automatically locally installing software on a computer system coupled, at least temporarily, to a network, the method comprising:

- establishing a network connection if the computer system is not already coupled thereto;
- starting a network browser program for retrieving, from a remote network location, a list of software programs installable by way of selectable installation scripts;
- selecting from the list an installation script for a software program, said installation script comprising pre-restart and post-restart installation instructions
- determining a script type of the script so as to determine whether there is local support for executing the installation script;
- if there is no local support, then automatically: interfacing with the remote network location and obtaining an exact location of an installer capable of processing the installation script, downloading the installer from the exact location, and installing the installer on the computer system;
- restarting the operating system; and
- performing the post-restart installation instructions so as to complete installation of the software program.

* * * * *

UNITED STATES PATENT AND TRADEMARK OFFICE
CERTIFICATE OF CORRECTION

PATENT NO.    : 6,078,951
DATED         : June 20, 2000
INVENTOR(S)   : Pashupathy et al.

It is certified that error appears in the above-identified patent and that said Letters Patent is hereby corrected as shown below:

<u>Column 3,</u>
Line 19, delete "VLUW", insert -- VLIW --.

Signed and Sealed this

Eleventh Day of February, 2003

JAMES E. ROGAN
*Director of the United States Patent and Trademark Office*